United States Patent [19]

Watts

[11] 4,067,396
[45] Jan. 10, 1978

[54] ROLL-OVER MECHANISM FOR TWO-WAY PLOW

[76] Inventor: Glen A. Watts, Rte. 1, Box 258, McMinnville, Oreg. 97127

[21] Appl. No.: 695,583

[22] Filed: June 14, 1976

[51] Int. Cl.² .......................... A01B 3/40; A01B 3/56
[52] U.S. Cl. ................................. 172/212; 172/225; 172/482; 172/494
[58] Field of Search ............... 172/212, 225, 285, 226, 172/227, 244, 482, 494

[56] References Cited

U.S. PATENT DOCUMENTS

| 3,507,334 | 4/1970 | Watts | 172/212 |
| 3,524,509 | 8/1970 | Richey | 172/212 |
| 3,656,556 | 4/1972 | Johannsen et al. | 172/212 |
| 3,818,995 | 6/1974 | Mellen | 172/212 |
| 3,934,653 | 1/1976 | Becker | 172/212 |

Primary Examiner—George J. Marlo
Attorney, Agent, or Firm—Oliver D. Olson

[57] ABSTRACT

Mechanism operating through a mechanical advantage for rolling over a two-way gang plow comprises a pair of hydraulic cylinders acting through respective short links connected pivotally at one of their ends to their associated cylinders and at their opposite ends pivotally to spaced pivots on a bell crank lever secured to the roll-over shaft of the plow, the spacing between the bell crank lever pivots being less than the spacing between the link pivots. Annular rings surround the roll-over shaft for abutment by the links during operation of the mechanism, providing each link with a fulcrum point which is arranged to augment the output of the associated hydraulic cylinder during the initial portion of its extension.

4 Claims, 8 Drawing Figures

ROLL-OVER MECHANISM FOR TWO-WAY PLOW

BACKGROUND OF THE INVENTION

This invention relates to a roll-over mechanism for two-way gang plows. In particular, it relates to such a roll-over mechanism wherein the actuation means operates through a mechanical advantage during the initial stage of the roll over operation in either direction.

In my earlier U.S. Pat. No. 3,507,334 the roll-over mechanism for two-way gang plows utilizes a pair of reciprocative hydraulic cylinders to roll over the plow blades. These cylinders are mounted in such manner that they must swing arcuately with the plow assembly, thereby involving long, flexible hydraulic lines and their attendant disadvantages.

SUMMARY OF THE INVENTION

In its basic concept, the roll-over mechanism of this invention utilizes mechanical levers to interconnect each of a pair of extensible hydraulic cylinders and the roll-over shaft of a two-way gang plow, to provide mechanical advantage in initiating the roll-over movement.

It is by virtue of the foregoing basic concept that the principal objective of this invention is achieved; namely; to overcome the aforementioned disadvantages of the roll-over mechanism of my earlier patent.

A further object of this invention is to provide a roll-over mechanism of the class described which is of simplified construction for economical manufacture and is of rugged, unitary design permitting severe treatment in use.

The foregoing and other objects and advantages of this invention will appear from the following detailed description, taken in connection with the accompanying drawing of a preferred embodiment.

DESCRIPTION OF A PREFERRED EMBODIMENT

Figure 1:
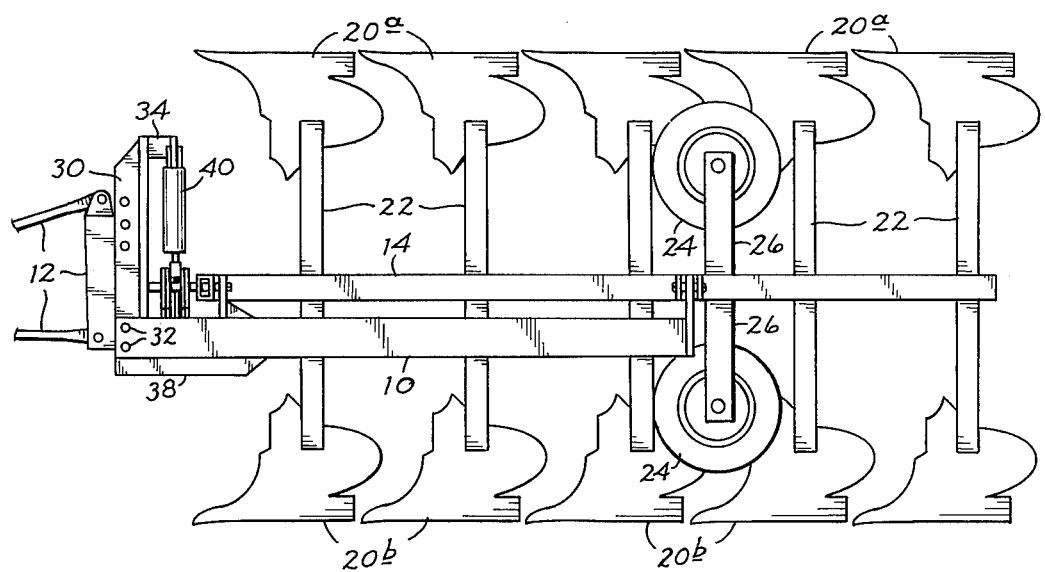
FIG. 1 is a side elevational veiw of a two-way plow incorporating a roll-over mechanism embodying the features of this invention.
Figure 2:
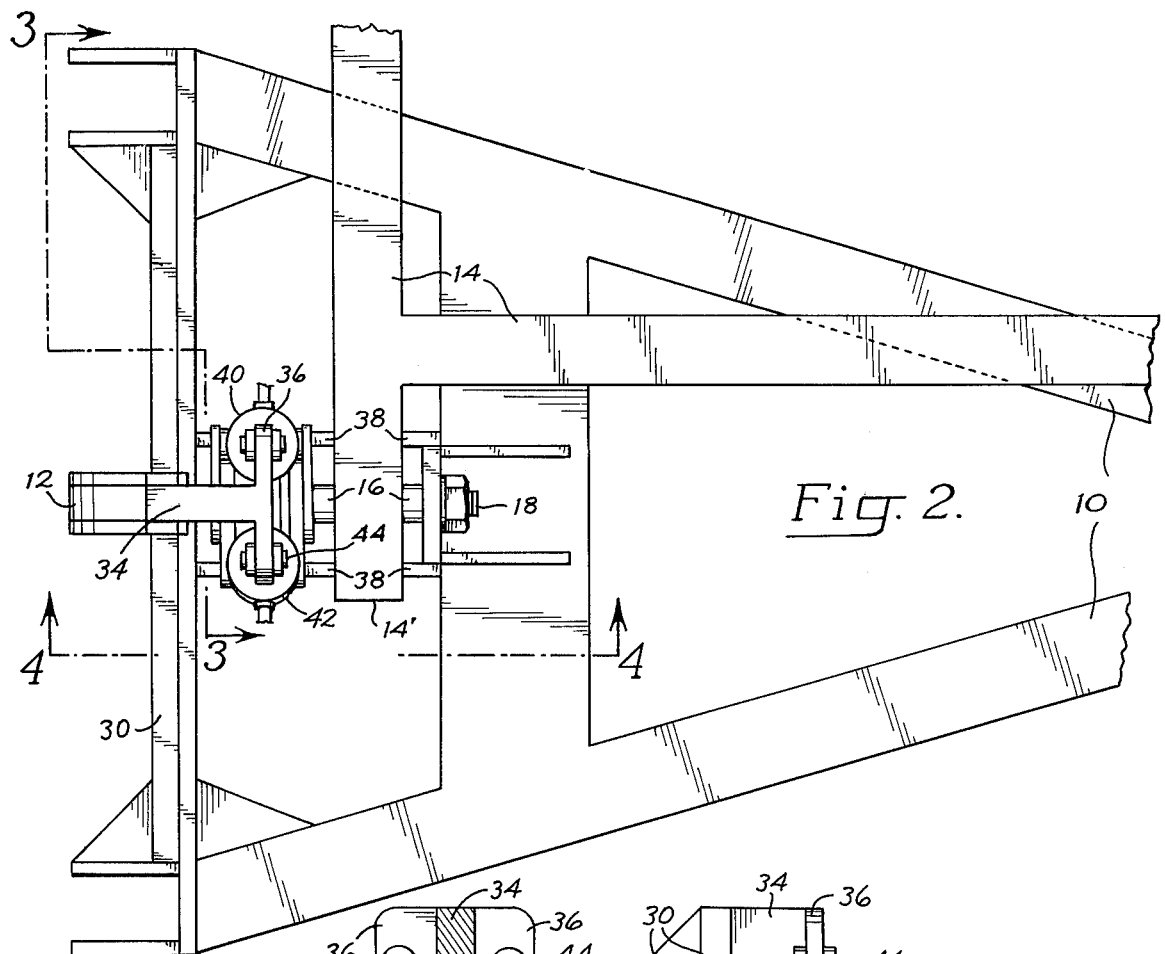
FIG. 2 is a fragmentary plan view, at an enlarged scale, of the two-way plow assembly of FIG. 1.

The roll-over machanism illustrated is used for actuating a two-way gang plow of the type disclosed in my prior U.S. Pat. Nos. 3,507,334 and 3,749,178. The plow, best shown in FIGS. 1 and 2, generally comprises a main frame 10, illustrated in the form of an A-frame and configured for towing connection behind a tractor or similar farm vehicle (not shown) by means such as hitch 12, and an elongated plow support frame 14, rotatably mounted on the A-frame by shaft means such as front and rear sleeve shafts 16 supported on bolt shafts 18. Brackets extend from the A-frame for carrying the shafts 18.

A set of left-hand plow bottoms 20a and a set of right-hand plow bottoms 20b are joined to opposite ends of plow holders 22 which are attached to the annular frame member of plow support frame 14 at longitudinally spaced intervals. Thus, when one set of plow bottoms is placed in its operative position, e.g. plow bottoms 20b in FIG. 1, the other set of plow bottoms 20a extends upwardly in an inoperative position.

Depth gauge wheels 24 are mounted for axial rotation on arms 26 which extend from the plow support frame 14 in the same directions as the plow bottom sets, and function to limit the depth of penetration of the plow bottoms into the soil, as will be understood.

A mounting frame 30 is attached to the open end of the A-frame 10, as by bolts 32, for mounting the roll-over mechanism of this invention. A horizontal arm 34, having paired transverse tabs 36 at its outer extremity, extends rearwardly from the upper end of frame 30. Stiffeners 38 interconnect the A-frame and the lower portion of the mounting frame for added support and strength.

Figure 3:
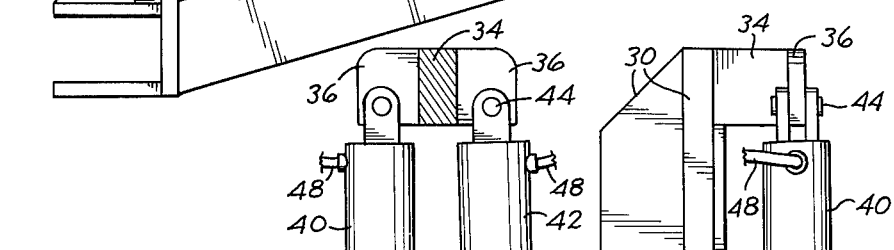
FIG. 3 is a fragmentary sectional view taken on the line 3—3 of FIG. 2, portions being broken away to disclose details.
Figure 4:
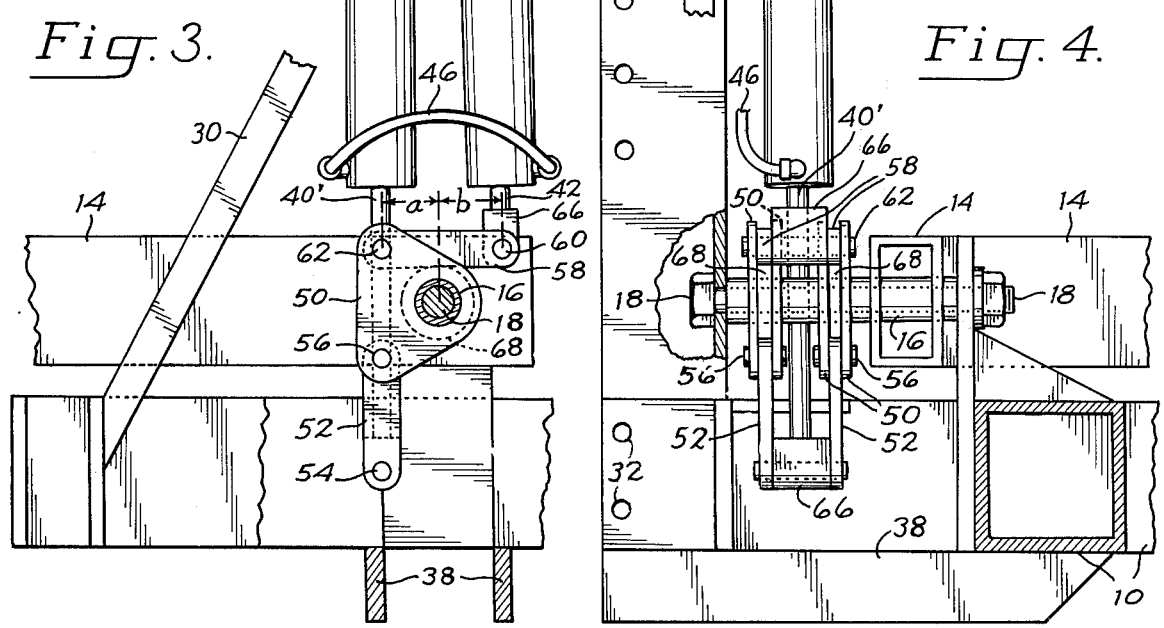
FIG. 4 is a fragmentary sectional view taken on the line 4—4 of FIG. 2, portions being broken away to disclose details.

The roll-over mechanism, which is mounted on the frame 30, includes a pair of reciprocative, extensible actuation means, such as first hydraulic cylinder 40 and second hydraulic cylinder 42. As best shown in FIGS. 3 and 4, the hydraulic cylinders are joined pivotally at their upper ends to tabs 36 by means of clevises and pins 44. Tubing 46 interconnects the lower ends of the hydraulic cylinders to provide a closed air chamber formed in the piston rod ends of the cylinders, and tubings 48 communicate the upper ends of the cylinders, through appropriate controls (not shown) selectively to a source of hydraulic fluid under pressure.

The roll-over mechanism is connected to the plow support frame 14, and thus to the plow bottoms, by means of forward sleeve shaft 16 secured rigidly to an extension 14' of frame 14. Triangular shaped plates 50 are secured rigidly at one of their apices to sleeve 16. In the embodiment illustrated, four such plates are arranged transversely on the sleeve in separated pairs, as best shown in FIG. 4. Each of these plates functions as a bell crank lever, as will now be explained.

A pair of short, flat first links 52 are pivotally connected at one end, by pivot pin 54, to the projecting end of the piston rod 40' of the first hydraulic cylinder 40, and at their opposite end, by pivot pins 56, to both pairs of the plates 50. Similarly, a second pair of links 58 are pivotally connected at one end, by pivot pin 60, to the projecting end of the piston rod 42' of the second cylinder 42, and at their opposite end, by pivot pins 62, to both pairs of the plates 50. In the embodiment illustrated two first links 52 and two second links 58 are spaced apart by spacers 66 attached to the extremities of the piston rods of the hydraulic cylinders.

In view of the spaced positions of sleeve shaft 16 and pivot pins 56 and 62 on the plates 50, the latter thus function as bell crank levers, as will be apparent.

Located between each pair of levers 50, and mounted on sleeve 16, are annular rings 68. Accordingly, they are disposed so that links 52 and 58 bear on them during the operation of the mechanism.

Figures 5, 6, 7, 8:
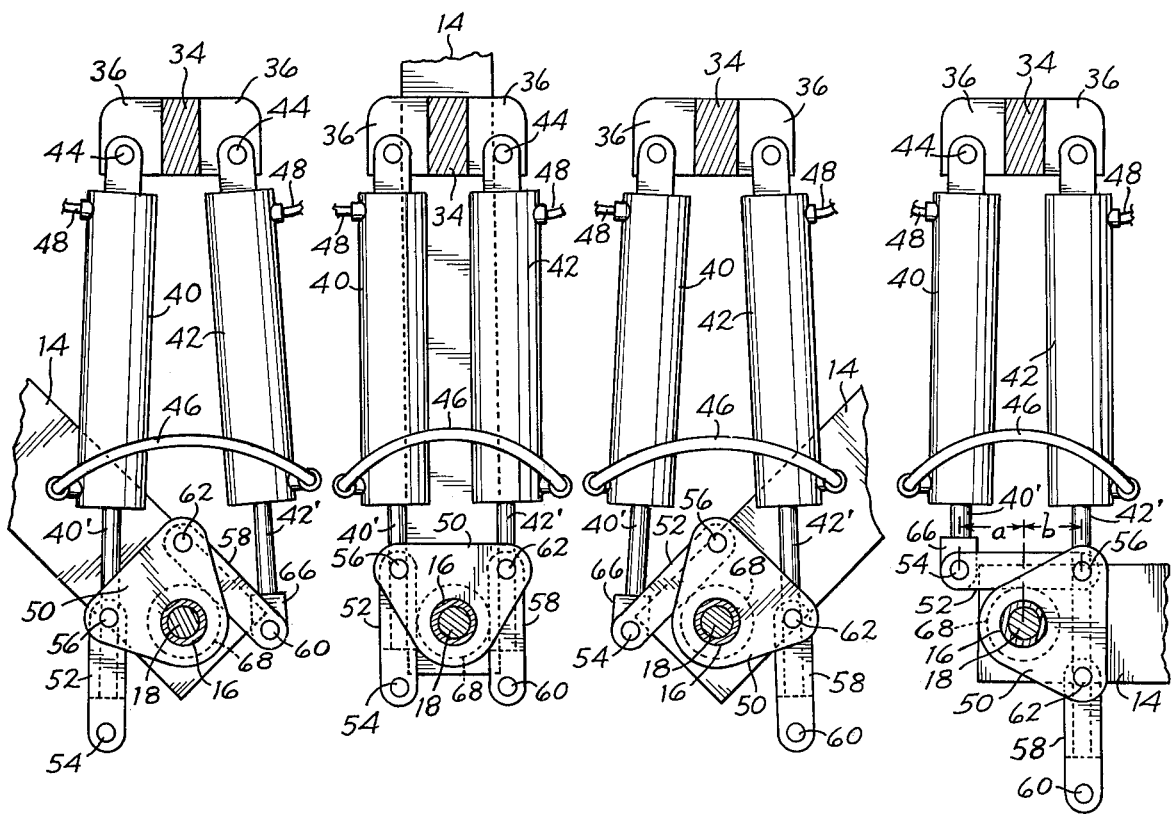
FIGS. 5-8 are fragmentary sectional views taken on the same line as FIG. 3 with parts removed for clarity, showing the operational sequence of the roll-over mechanism.

As is best shown in FIG. 3, the levers 50, the links 52 and 58, the rings 68 and the sleeve 16 are oriented relative to each other in such a manner that when the first hydraulic cylinder 40 is extended completely and the second hydraulic cylinder 42 is retracted completely, the first link 52 is substantially parallel with the piston rod 40' of hydraulic cylinder 40, the second link 58 is substantially normal to the piston rod 42' of hydraulic cylinder 42, and the frame 14 locates one set of plow bottoms in its operative position. Conversely, as is best shown in FIG. 8, when the first hydraulic cylinder 40 is retracted and the second hydraulic cylinder 42 is extended the first link 52 is substantially normal to the piston rod 40', second link 58 is substantially parallel to the piston rod 42', and the opposite set of plow bottoms is located in its operative position.

In the operation of the roll-over mechanism described hereinbefore, if one set of plow bottoms is in the operative position, as shown in FIGS. 1, 2, 3 and 4, and it is desired to place the other set in the operative position, the roll-over mechanism is operated for movement of the mechanism as shown sequentially in FIGS. 3, 5, 6, 7 and 8. Referring first to FIG. 3, ram 40' of the first hydraulic cylinder is in its extended position and ram 42' of the second hydraulic cylinder is in its retracted position. As a result, first links 52 are vertical and second links 58 are horizontal.

As the ram 42' of the second hydraulic cylinder 42 is extended, by application of pressurized hydraulic fluid to the upper end of cylinder 42', it acts on levers 50 through lever arm 58, initiating clockwise rotation of sleeve shaft 16 and thus the plow frame 14 and plow bottoms. It is to be noted in FIG. 3 that the length *a* from the fulcrum point of lever 58 to the axis of pivot pin 62 is less than the length *b* from the fulcrum point to the axis of pivot pin 60. As a result, hydraulic cylinder 42 works through a mechanical advantage when starting clockwise movement of the sleeve 16 and plow frame 14.

Simultaneously with the extension of cylinder 42, ram 40' of cylinder 40 is retracted by the clockwise rotation of plates 50.

Completion of the roll-over operation, to position the plow bottoms 20a in operative, ground-working condition, is achieved by continuing the application of hydraulic pressure to the upper end of cylinder 42 until the bell crank levers 50 are rotated through the positions of FIGS. 5, 6 and 7 to the position of FIG. 8.

To roll the plow bottoms back over, from FIG. 8 to the position of FIG. 3, hydraulic fluid under pressure is applied to the upper end of cylinder 40 to effect its extension and simultaneous retraction of cylinder 42. The same mechanical advantage for initiating this counterclockwise rotation of sleeve 16 is provided by the greater length *a* of lever 52 in FIG. 8 than length *b*, as described hereinbefore.

When the plow bottoms are not being used, such as during transportation, they can be stored in the intermediate position of FIG. 6, with neither set interferring with towing of the apparatus.

It will be apparent to those skilled in the art that various changes may be made in the size, shape and arrangement of parts described hereinbefore. For example, while hydraulic cylinders are shown for their positive, trouble-free operation in the dusty environment and because of the availability of pressurized hydraulic fluid on farm machinery, other extensible, reciprocative actuation means such as pneumatic cylinders, motor driven screws, and others, may be used. In addition they may be mounted in other than the vertical orientation shown depending on the space available. The pivot pins 56 and 62 may be secured directly to the plow frame extension 14', thereby eliminating the plates 50. However, their relationship with sleeve 16 still renders the arrangement operable as bell crank levers, as will be understood. The provision of the plates 50 is preferred for the obvious structural quality they afford. These and other modifications may be made as desired without departing from the spirit of this invention.

Having now described my invention and the manner in which it may be used, I claim:

1. A roll-over mechanism for a two-way gang plow having right and left hand plow bottoms mounted on a supporting frame rotatable about a horizontal axis carried by a main frame, the roll-over mechanism comprising:

a. a pair of extensible, reciprocative actuation means for rotating the supporting frame,
    b. mounting means on the main frame for securing one end of each of the pair of actuation means in fixed position relative to the main frame,
    c. a lever pivotally interconnecting the opposite end of each of the pair of actuation means and the supporting frame, and
    d. fulcrum means coaxial with said horizontal axis arranged for engagement by said levers intermediate the ends thereof for providing leverage in initiating rotation of the supporting frame from the operative positions of the plow bottoms.

2. The roll-over mechanism of claim 1 including a bell crank lever fixed relative to the supporting frame for rotation therewith about said horizontal axis, the levers being connected pivotally to the bell crank lever at their ends opposite their connection to the actuation means.

3. The roll-over mechanism of claim 2 including a shaft carried by the main frame and forming said horizontal axis, a sleeve mounted on the shaft for rotation relative thereto and secured rigidly to the supporting frame, and a plate forming said bell-crank lever secured rigidly to the sleeve.

4. The roll-over mechanism of claim 2 wherein the plow includes a shaft mounting the supporting frame on the main frame for rotation about said horizontal axis, the fulcrum means comprises a ring mounted on the shaft, and the pair of actuation means comprise a first hydraulic cylinder pivotally joined at one end to the mounting means on the main frame and pivotally connected at its other end to the end of one of the levers opposite its pivot connection to the bell crank lever, and a second hydraulic cylinder pivotally joined at one end to the mounting means on the main frame and pivotally connected at its other end to the end of the other lever opposite its pivot connection to the bell crank lever.

* * * * *